United States Patent [19]

Bonnefous

[11] Patent Number: 5,000,183
[45] Date of Patent: Mar. 19, 1991

[54] DEVICE FOR PROCESSING AN ECHOGRAPHIC SIGNAL

[75] Inventor: Odile Bonnefous, Nogent Sur Marne, France

[73] Assignee: U.S. Philips Corporation, New York, N.Y.

[21] Appl. No.: 407,516

[22] Filed: Sep. 15, 1989

[30] Foreign Application Priority Data

Sep. 30, 1988 [FR] France .................. 88 12804

[51] Int. Cl.⁵ .............................................. A61B 8/00
[52] U.S. Cl. ............................ 128/660.01; 128/661.01; 73/602
[58] Field of Search ................ 128/660.01, 661.01; 73/602, 626, 625

[56] References Cited

U.S. PATENT DOCUMENTS

| | | | |
|---|---|---|---|
| 4,817,015 | 3/1989 | Insana et al. | 73/602 X |
| 4,886,069 | 12/1989 | O'Donnell | 128/661.01 |
| 4,951,676 | 8/1990 | Collet-Billon | 73/602 X |

OTHER PUBLICATIONS

Abott, J. G. et al., "Multi-Scan Processing" 1978 IEEE Symposium, Cherry Hill N. J. Cat #78CH1344-ISU pp. 220-224.

*Primary Examiner*—Francis Jaworski
*Attorney, Agent, or Firm*—William Squire

[57] ABSTRACT

A device for processing an echographic signal $S_o(t)$, includes:

a sampling device which supplies N discrete values $C_{ok}$ of $S_o(t)$ where k is 1, 2, ..., N, p decomposition units ($200j$, j=1, 2, ..., p), each comprising:

a low frequency transmission channel including a low pass filter ($201j$) for correlation of the input signal $S_{j-1}(t)$ with a sealing filter h(t), and a decimator ($202j$) which retain selective values with respect to k of the correlation, the $N/2^j$ values $C_{jk}$, for k=1, $1+2^j$, $1+2\times 2^j$, ..., representing $s_j(t)$, the low-frequency component of $S_o(t)$ of the order j, a high-frequency reducing channel which successively comprises a high-frequency filter ($203j$) for correlation of the input signal $S_{j-1}(t)$ with a wavelet filter g(t), and a decimator ($204j$) which retains selective values with respect to k of the correlation, the $N/2^j$ values $W_{jk}$ for k=1, $1+2^j$, $1+2\times 2^j$, $1+3\times 2^j$, ..., stored in a memory and representing $D_j(t)$ the high-frequency component of $S_o(t)$ of the order j, p cascade connected reconstruction units ($400j$), each comprising:

a high-frequency enhancement channel which comprises a cirucit ($401j$) for comparing $C'_{jk}/W_{jk}$ with a predetermined threshold, $A_j$, $C'_{jk}$ representing the values of $S'_j(t)$, which outputs the $N/2^j$ values of $W_{jk}$ if $C'_{jk}/W_{jk}<A_j$ for all k, or $N/2^j$ zeros in the opposite case, a circuit ($402j$) for doubling the sampling, and a high-frequency convolution circuit ($403j$) for convolution of the signal supplied by the circuit ($402j$) for doubling sampling with the wavelet filter g(t), an actual reconstruction channel comprising a sample doubling cirucit, a low-frequency convolution circuit ($405j$), an adder ($406j$) which supplies the reconstructed signal $S'_{j-1}(t)$ of the order j−1 by forming the sum of the output signals of high-frequency and low-frequency convolution circuits ($403j$, $405j$).

1 Claim, 5 Drawing Sheets

DEVICE FOR PROCESSING AN ECHOGRAPHIC SIGNAL

BACKGROUND OF THE INVENTION

The invention relates to a device for processing an echographic signal $S_o(t)$.

The invention can be used particularly advantageously in the field of medical echography, notably for the formation of images of organs of interest is commonly owned copending application Ser.No. 496,478 entitled "Ultrasonic Echographic Imaging Devices Utilizing an Improved Adaptive Filter" filed Mar. 20, 1990 in the name of Antoine Collet-Billon.

The general technical problem to be solved by any echographic signal processing device usually consists in that an exact as possible image of the medium subjected to the examination is to be obtained, i.e. exact both as regards contours and the specular walls it contains.

Various solutions to this general technical problem have already been proposed. Reference is made notably to the article by M. Fink "Imagerie ultrasonore", published in Journal de Physique Appliquée 18 (1983) pp. 527-556, which exhaustively analyses the various aspects of the formation of echographic images. Even though they often lead to satisfactory results, all known solutions have given limitations. Actually, the determination of contours of organs and the detection of low-contrast objects are disturbed by constructive and destructive interference of echos produced by the multi-scatter points contained in the medium studied, that is to say in relation to the coherent nature of the ultrasonic wave emitted by the piezoelectric transducer. This parasitic phenomenon is similar to that which is known as "speckle" in the optical field and which gives rise to "light grains" which are often encountered in laser emission. The main drawbacks of this interference noise in the ultrasonic field on the one hand consist of a deterioration of the quality of the echographic images, notably a loss of visibility in low-contrast areas, and on the other hand consist of a wide frequency band and a strong variance which make the customary contour detection processes ineffective.

Therefore, it will be apparent that the reduction of "speckle" is a decisive factor in improving the quality of echographic images. To this end, various methods have been proposed:

on the one hand, methods which involve signal processing before acquisition in order to realise "speckle" decorrelation. This is, for example, the spatial composition (see the article by C. B. Burkhardt in IEEE Trans. Sonics Ultrasonics, SU25 1-6 (1978)). This method generally results in echographic images of good quality. It has the drawback however, that it necessitates the use of a complex and intricate electronic processing device. Moreover, the aquisition time is comparatively long and precludes the real-time formation of images.

on the other hand, smoothing methods which are applied after the formation of the image, for example using a lowpass filter which effectively reduces the fluctuations which are due to speckle but which introduces a blur in the images by widening the contours.

Thus, the technical problem to be solved in accordance with the invention consists in the construction of a processing device for an echographic signal $S_o(t)$ which would be of the "a posteriori processing of the signal" type but which would reduce the "speckle" effect to a substantial degree while maintaining distinct image contours.

SUMMARY OF THE INVENTION

In accordance with the invention, this technical problem is solved in that the device comprises:

a sampling device which supplies N discrete values $C_{ok}$ of the echographic signal $S_o(t)$, where k is 1, 2, ..., N, p cascade-connected decomposition units, each of which comprises:

a low-frequency transmission channel which successively comprises a low-frequency filter which realises the correlation of the input signal $S_{j-1}(t)$ with a filter h(t), referred to as a the scaling filter, and a decimator which retains only one out of two values with respect to k of the result of the correlation, so in total the $N/2^j$ values $C_{jk}$ for $k=1, 1+2^j, 1+2\times 2^j, 1+3\times 2^j, \ldots$, representing $S_j(t)$ which is referred as the low frequency component of $S_o(t)$ of the order j, a high-frequency reducing channel which successively comprises a high-frequency filter which realises the correlation of the input signal $S_{j-1}(t)$ with a filter g(t), referred to as a wavelet filter, and a decimator which retains only one of two values with respect to k of the result of the correlation, so in total the $N/2^j$ values $W_{jk}$, for $k=1, 1+2^j, 1+2+2^j, 1+3\times 2^j, \ldots$, stored in a memory and representing $D_j(t)$, which is referred to as the high frequency component of $S_o(t)$ of the order j, the low frequency and high frequency filters being quadrature mirror filters, p cascade connected reconstruction units, each of which comprises:

a high frequency enhancement channel which successively comprises a circuit for comparing $|C'_{jk}/W_{jk}|$ with a predetermined threshold $A_j$, $C'_{jk}$ representing the values of $S'_j(t)$ which is the reconstructed signal of the order j, which comparison circuit outputs the $N/2^j$ values of $W_{jk}$ if $|C'_{jk}/W_{jk}| < A_j$ for all k, or $N/2^j$ zeros in the opposite case, a circuit for doubling the sampling which inserts a zero between two consecutive values of the signal supplied by the comparison circuit, and a high frequency convolution circuit which realises the convolution of the signal supplied by the circuit for doubling the sampling with the wavelet filter g(t), an actual reconstruction channel which successively comprises a circuit for doubling the sampling which inserts a zero between two consecutive values of $C'_{jk}$, a low frequency convolution circuit which realises the convolution of the signal supplied by the circuit for doubling the sampling with the scaling filter h(t) and an adder which supplies the reconstructed signal $S'_{j-1}(t)$ of the order $j-1$ by forming the sum of the output signals of the high frequency and low frequency convolution circuits.

The quadrature mirror filters are known, for example, from the article "A Theory for Multiresolution Signal Decomposition: the Wavelet Representation" by S. G. Mallat. Let H(f) and G(f) be two of such filters in the domain of the frequencies f. By definition they satisfy the relations:

$$G(f) = \exp(-2\pi f) H(f + F_e/2) \tag{1}$$

$$H^2(f) + G^2(f) = 1 \qquad (2)$$

where $F_e$ is the sampling frequency.

As appears from the relation (2), the quadrature mirror filters have the attractive property that they are complementary as regards energy, the entire signal being preserved even after having been processed by the filters. Therefore, it is to be noted that so far the processing device in accordance with the invention operates very strictly, without approximation and without loss of information.

In the time domain, the filters g(t) and h(t) correspond to the filters G(f) and H(f). If H(f) is a low pass filter, it is significative of the size of the objects being studied; H(f) and h(t) are then referred to as scaling filters. Conversely, if G(f) is a high pass filter, it is representative of the high-frequency components of the image studied and G(f) and g(t) are then referred to as wavelet filters.

The operation of the scaling and wavelet filters can be summarised as follows. The echographic signal $S_o(t)$ to be analysed is sampled on N values $C_{ok}$ with a given sampling step. The filters g(t) and h(t) are also sampled, using the same step on a given number of n values, n being smaller than N. The above relation (1) is then translated as: $g_l = (-1)^{1-l} h_{1-l}$. The low frequency filter and the decimator perform a correlation operation with the scaling filter, followed by the suppression of one of the two values obtained, which operation is expressed by the relation:

$$C_{1k} = \Sigma_l C_{o,l+2k} h_l$$

summing being performed on n values of l.

Generally speaking, for the order j there is obtained:

$$C_{jk} = \Sigma_l C_{j-1,l+2k} h_l$$

$C_{jk}$ are the scaling parameters of the decomposition order j. Similarly, the overall effect of the high frequency filter and the decimator is the calculation of the parameters of the wavelets $W_{jk}$ of the order j, given by:

$$W_{jk} = \Sigma_l C_{j-1,l+2k} g_l$$

Thus it appears that upon each passage through a decomposition unit, the components of highest frequency of the signal $S_j(t)$ represented by $C_{jk}$ are reduced, the frequencies extracted being lower each time.

The scaling parameters $C_{jk}$ and the wavelet parameters $W_{jk}$ can be interpreted other than as quantities resulting from the correlation with the filters h(t) and g(t). Actually, the described quadrature mirror filter theory and the article by I. Daubechies "Orthonormal Bases of Compactly Supported Wavelets" teach that with the scaling filters h(t) and the wavelet filters g(t) there may be associated functions $\Phi(t)$ and $\phi(t)$ which are referred to as scaling and wavelet functions related to the filters g(t) and h(t) by:

$$\Phi(t) = \frac{\pi}{p} \times h(2^p t)$$

$$\phi(t) = g(2t) \times \Phi(2t)$$

where $\times$ represents the convolution product.

On the basis of the scaling and wavelet functions $\Phi(t)$ and $\phi(t)$ orthonormalised bases can be reconstructed for the functions $\Phi_{jk}(t)$ and $\phi_{jk}(t)$ defined by:

$$\Phi_{jk}(t) = 1/\sqrt{2^j} \, \Phi((t - 2^j k)/2^j)$$

and $$\phi_{jk}(t) = 1/\sqrt{2^j} \, \phi((t - 2^j k)/2^j)$$

Thus, it appears that $C_{jk}$ is the projection of the signal $S_o(t)$ on the base function $\Phi_{jk}(t)$:

$$C_{jk} = <S_o(t), \Phi_{jk}(t)> = \int S_o(t) \Phi_{jk}(t) dt$$

which is also:

$$C_{jk} = <S_{j-1}(t), \Phi_{jk}(t)> = \int S_{j-1}(t) \Phi_{jk}(t) dt$$

Similarly, it is demonstrated that $W_{jk}$ is the projection of $S_o(t)$ on the function $\phi_{jk}(t)$:

$$W_{jk} = <S_o(t), \phi_{jk}(t)> = \int S_o(t) \phi_{jk}(t) dt$$

and $$W_{jk} = <S_{j-1}(t), \phi_{jk}(t)> = \int S_{j-1}(t) \phi_{jk}(t) dt$$

The reconstruction phase of the signal progresses in the reverse order with respect to the decomposition phase. In each reconstruction unit the signal being reconstructed is enhanced with its high frequency components $W_{jk}$ which are saved in the memory during the decomposition. However, this enhancement is conditional: for each k the ratio $|C'_{jk}/W_{jk}|$ must be smaller than a threshold $A_j$. $C'_{jk}$ represents the reconstructed signal of the order $j-1$, $C'_{jk}$ differing from $C_{jk}$ if in a given reconstruction stage the high-frequency enhancement is not carried out because the above condition has not been satisfied. In other words, each high frequency enhancement channel supplies the parameters $W_{jk}'$ given by $W_{jk}' = W_{jk}$ if for all k $|C'_{jk}/W_{jk}| < A_j$. $W_{jk} = 0$ in the opposite case.

This conditional reconstruction of the frequencies is essential. Actually, there thus exist p thresholds $A_j$ which can be independently adjusted as desired as a function of the processing operation to be performed on the echographic signal. For example, for the elimination of high-frequency details (order $j=1$) and the enhancement of the contours (for example, order 4), there will be fixed a low threshold $A_1$ and a high threshold $A_4$. Thus, the speckle whose texture generally corresponds to an order $j=1$ can be very selectively reduced. For the "speckle" an estimation of the threshold $A_1$ can be found. Actually, the ratio $|C'_{1k}/W_{1k}|$ can be analysed in terms of the signal-to-noise ratio, it being known from theory that the signal-to-noise ratio of speckle amounts to 1.91. In order to eliminate the speckle, therefore, a threshold $A_1$ of 1.91 or 2 will be applied. Generally speaking, the objects of an echographic image can be classified as a function of their order j:

| | order | |
|---|---|---|
| speckle | | j = 1 |
| walls | | 1 |
| texture | | 2 |
| cysts | | 2, 3 |
| anatomical objects | | 3, 4 |

If large objects such as cysts are to be favoured, a low threshold will be placed in the lower orders and a high threshold in the higher orders, for example $A_1 = 2$, $A_2 = 3$, $A_3 = 4$. However, if the walls are to be favoured, a high threshold of the order 1 will be applied.

The conjugated effect of the doubling of sampling and the low frequency convolution with the scaling filter h(t) is expressed by the transformation of the coefficients $C'_{j+1,k}$ to the coefficients $C'_{jk}$ defined, in accordance with the parity of k, by $$C'_{j2k} = \Sigma_l C'_{j+1,k+l} h_{2l} \text{ for k even}$$

$$C'_{j2k+1} = \Sigma_l C'_{j+1,k+l+1} h_{2l+1} \text{ for k odd}$$

Similarly, the effect of the doubling of sampling and the high frequency convolution with the wavelet filter g(t) is expressed as:

$$W'_{j2k} = \Sigma_l W'_{j+1,k+l} g_{2l} \text{ for k even}$$

$$W'_{j2k+1} = \Sigma_l W'_{j+1,k+l+1} g_{2l+1} \text{ for k odd}$$

Thus, the reconstructed signal $S'_j(t)$ of the order j, can be developed on the base functions $\Phi_{jk}(t)$ and $\phi_{jk}(t)$ as:

$$S'_j(t) = \Sigma_k C'_{j+1,k} \Phi_{j+1,k}(t) + \Sigma_k W'_{j+1,k} \phi_{j+1,k}(t)$$

The latter relation imparts a physical significance to the scaling and wavelet base functions, these are the functions on which the reconstructed signals are decomposed. This important remark enables the establishment of a criterion for the selection of the filters g(t) and h(t) on which thus far nothing has been imposed except for their nature of quadrature mirror filters, without disclosing exactly the construction. The appearance of the initial echographic signal $S_o(t)$ being known, the scaling function $\Phi(t)$ will be selected which approximates the envelope of $S_o(t)$ as well as possible. The wavelet function $\phi(t)$ is deduced therefrom by applying the orthogonal function rule:

$$<\Phi(t), \phi(t)> = \int \Phi(t) \phi(t) dt = 0$$

where $\Phi(t)$ and $\phi(t)$ serve as a base for the construction of the functions $\Phi_{jk}(t)$ and $\phi_{jk}(t)$. The form of the filters g(t) and h(t) will be extracted from the relations given above, linking $\Phi(t)$ and $\phi(t)$ to g(t) and h(t).

The invention will be described in detail hereinafter, by way of example, with reference to the accompanying drawings.

DETAILED DESCRIPTION OF THE PREFERRED EMBODIMENTS

Figure 1:
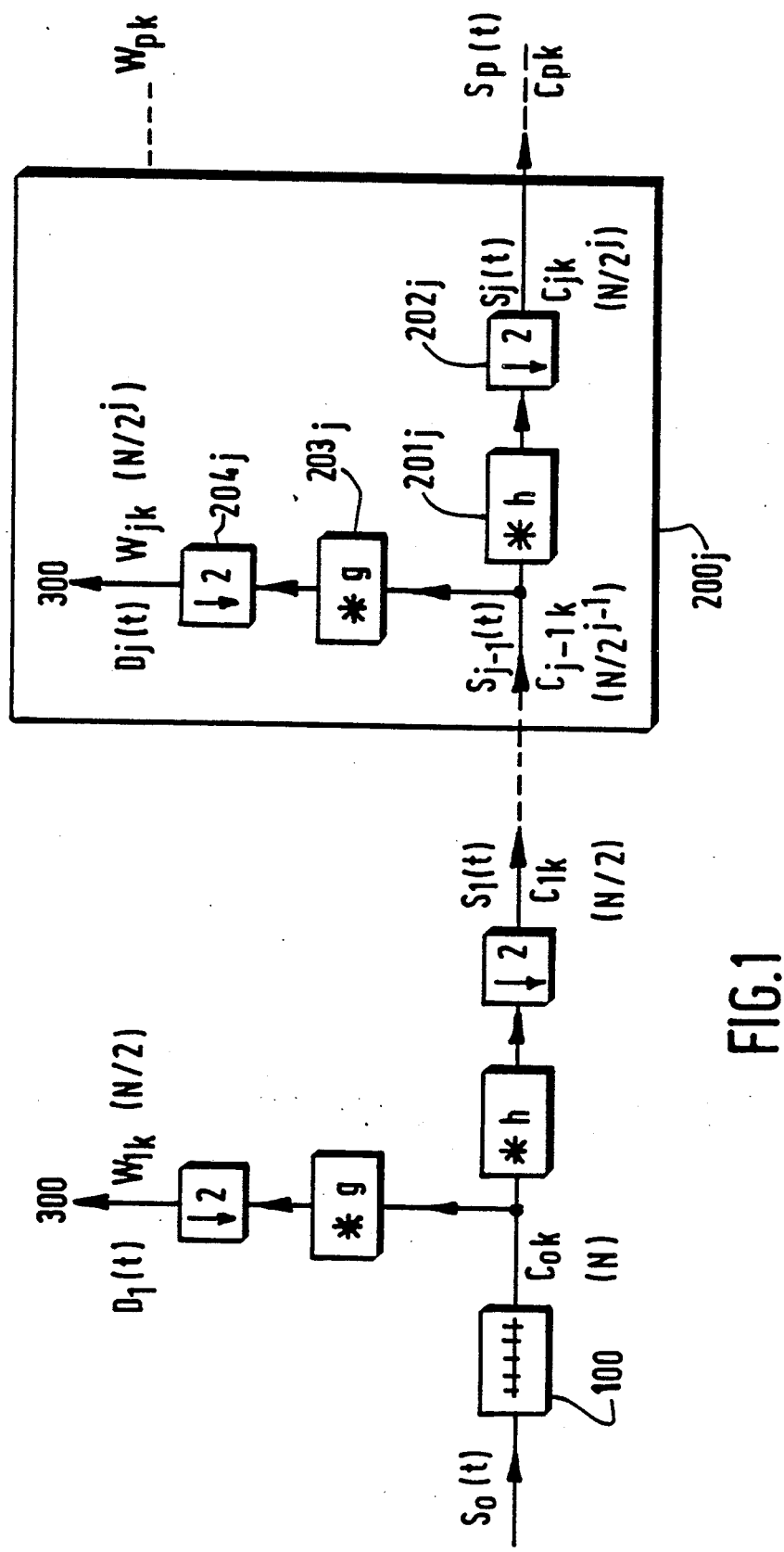
FIG. 1 shows the first part of the block diagram of a processing device in accordance with the invention.

FIG. 1 shows the first part of the block diagram of a device for processing an echographic signal $S_o(t)$, comprising a sampling device 100 which supplies N discrete values $C_{ok}$ of the input signal $S_o(t)$, where k is 1, 2, ..., N. The signal $S_o(t)$ thus sampled is successively processed by p cascade-connected decomposition units $200_j$. Each decomposition unit comprises two channels: a low frequency transmission channel and a high frequency reducing channel, the p successive low frequency transmission channels being connected in series with respect to one another. Each low frequency transmission channel comprises a low frequency filter $201_j$ which performs the correlation of the input signal $S_{j-1}(t)$, being the low frequency component of $S_o(t)$ of the order j−1, with a filter h(t) which is referred to as a scaling filter. As described above the filter h(t) is constructed on the basis of a suitably chosen scaling function $\Phi(t)$ and is sampled, with the same sampling step as $S_o(t)$, at a number of n points, where n amounts to from 4 to 20, thus enabling easy implementation of the filter h(t).

The filter $201_j$ thus outputs the coefficients $C_{jk}$ of which a decimator $202_j$ retains only one of two values. Thus, the low frequency transmission channel of the decomposition unit $200_j$ supplies $N/2^j$ coefficients $C_{jk}$ representing $S_j(t)$, being the low-frequency component of $S_o(t)$ of the order j, where k is equal to 1, $1+2^j$, $1+2\times 2^j$, $1+3\times 2^j$, .... The number of p decomposition units is thus finite and amounts to at the most logN/log2, it being understood that p can be limited to an arbitrary number without affecting the later reconstruction of the signal.

The high frequency reducing channel similarly comprises a high frequency filter $203_j$ which realises the correlation of the input signal $S_{j-1}(t)$ with a wavelet filter g(t), the filters h(t) and g(t) being quadrature mirror filters. A decimator $204_j$ retains only one of two values of the correlation result, so in total the $N/2^j$ values $W_{jk}$ representing $D_j(t)$ being the high frequency component of $S_o(t)$ of the order j. Contrary to the coefficients $C_{jk}$ which are used from the decomposition unit to the other, the coefficients $W_{jk}$ are stored in a memory 300 for later use. The decomposition continues until the order p.

Figure 2:
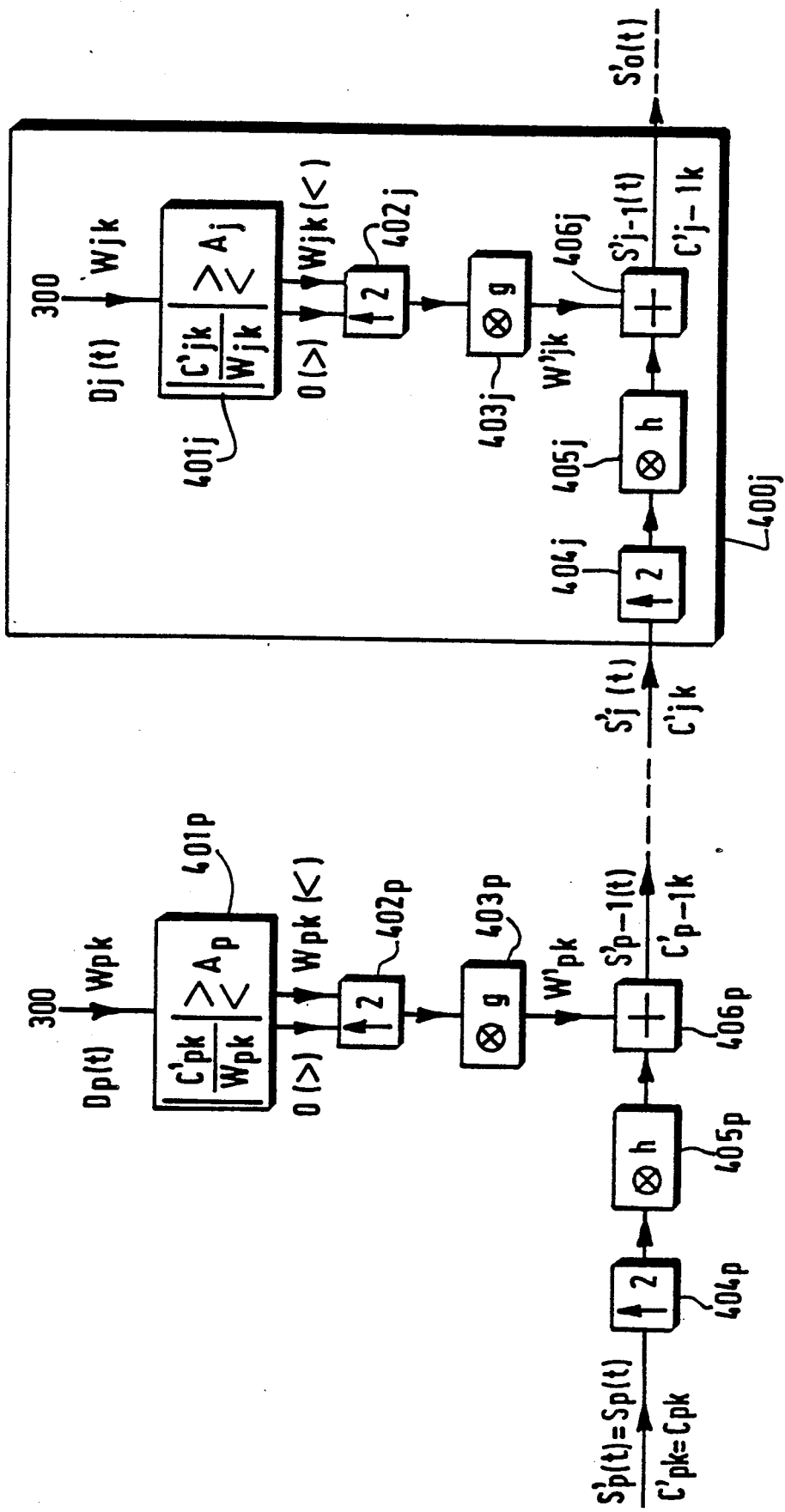
FIG. 2 shows the second part of the block diagram of the processing device whose first part is shown in FIG. 1.

FIG. 2 shows the second part of the block diagram of the processing device, which part relates to the reconstruction of the signal. In a symmetrical fashion with respect to the decomposition, the processing device comprises p cascade connected reconstruction units $400_j$. Each reconstruction unit $400_j$ comprises two channels: a high frequency enhancement channel and an actual reconstruction channel, the p successive reconstruction channels being connected in series with respect to one another. Each high frequency enhancement channel comprises a circuit $401_j$ for comparing the quantities $|C'_{jk}/W_{jk}|$ with a predetermined threshold $A_j$, where $C'_{jk}$ represents the values of the input signal $S'_j(t)$, being the reconstructed signal of the order j. If for all k $|C'_{jk}/W_{jk}|$ is smaller than $A_j$, the comparison circuit $401_j$ outputs the $N/2^j$ coefficients $W_{jk}$ stored in a memory 300. If the opposite comparison result is obtained, the comparison circuit $401_j$ supplies only zeros. A circuit $402_j$ for doubling the sampling changes the number of samples from $N/2^j$ to $N/2^{j-1}$ by inserting a zero between two consecutive values of the signal supplied by the comparison circuit $401_j$. Finally, a high frequency convolution circuit $403_j$ realises the convolution of the signal supplied by the circuit $402_j$ for doubling the sampling with the wavelet filter g(t).

The actual reconstruction channel also comprises a circuit $404_j$ for doubling the sampling which inserts a zero between two consecutive values of $C'_{jk}$. The signal from the circuit $404_j$ for doubling the sampling is convoluted with the scaling filter h(t) by a low frequency convolution circuit $405_j$. Finally, an adder $406_j$ supplies the reconstructed signal $S'_{j-1}(t)$ of the order $j-1$ by forming the sum of the output signals of the high-frequency and low-frequency convolution circuits $403_j$, $405_j$. The frequencies re-injected by each reconstruction unit $400_j$ are each time higher and higher. The reconstruction process continues until $S'_o(t)$ is obtained. If all coefficients $W_{jk}$ were reconstructed with $C'_{jk}$, there would be obtained $C'_{jk}=C_{jk}$ and $S'_o(t)=S_o(t)$.

Figure 3A:
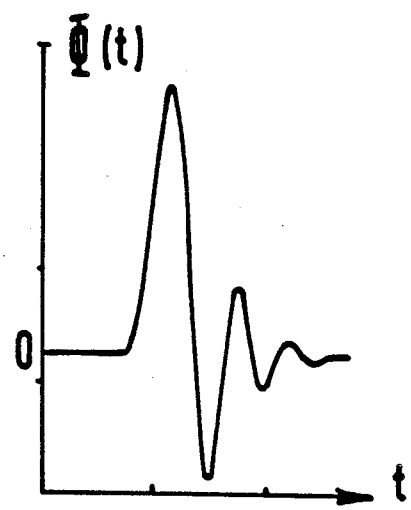
FIGS. 3a and 3b show an example of a scaling function $\Phi(t)$ and a wavelet function $\phi(t)$, respectively.
Figure 3B:
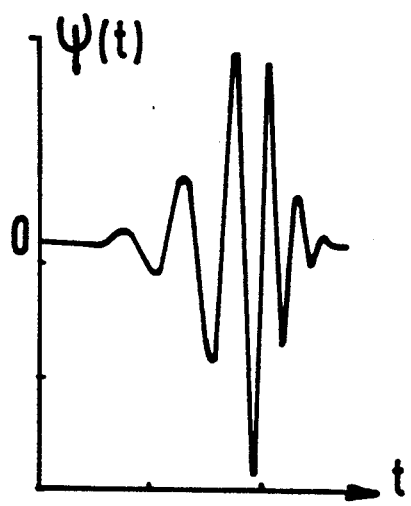

The FIGS. 3a and 3b show examples of the scaling and wavelet functions $\Phi(t)$ and $\phi(t)$ which can be used for the decomposition and the reconstruction of an echographic signal. These functions are derived from the cited article by I. Daubechies which also contains many other examples.

Figure 4:
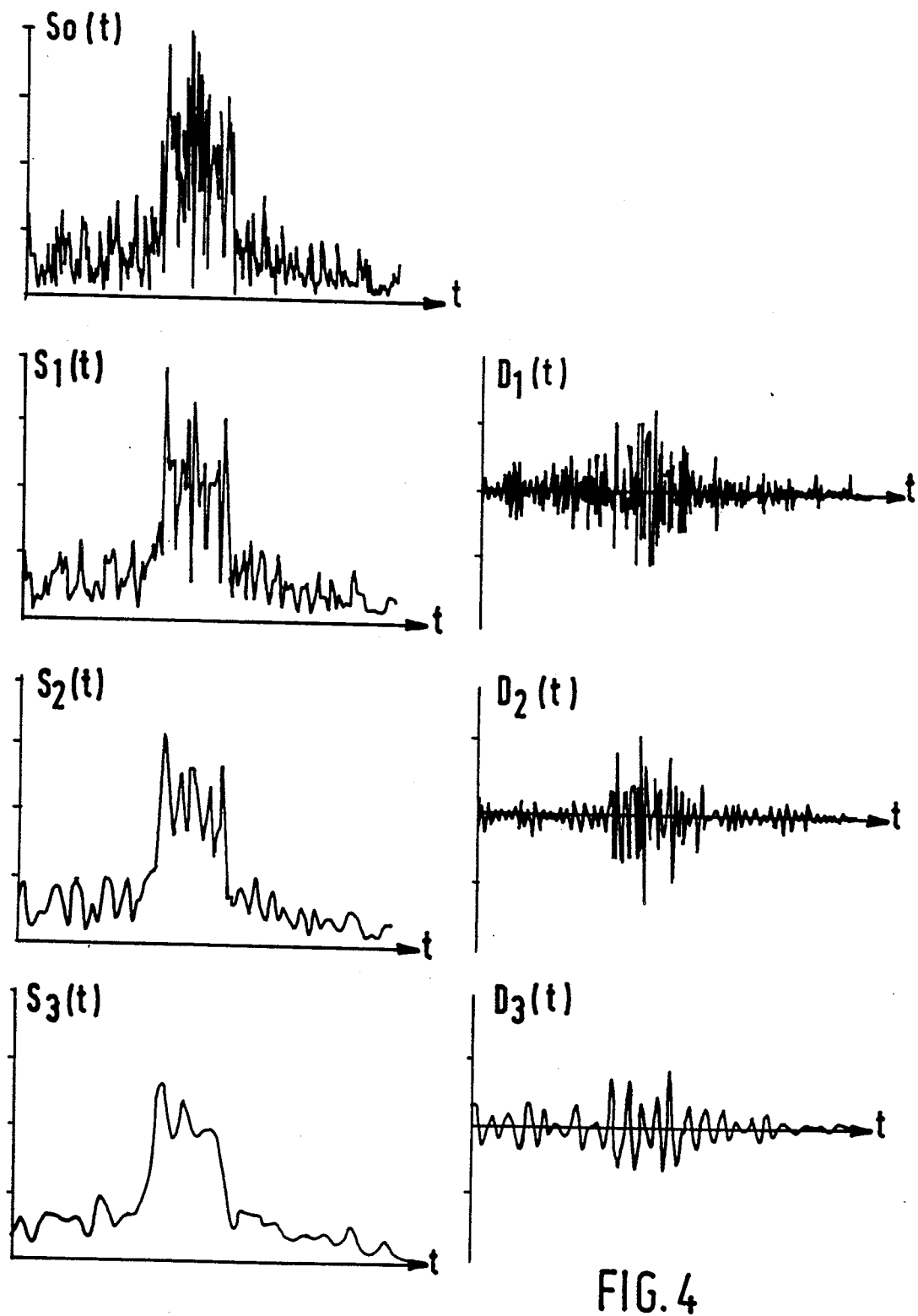
FIG. 4 shows the successive decomposition phases to the order 3 of a signal $S_o(t)$ by means of the scaling and wavelet functions of FIG. 3.

FIG. 4 shows the successive reconstruction stages up to the order j=3 for an echographic signal $S_o(t)$ by means of the functions $\Phi(t)$ and $\phi(t)$ of FIG. 3. It will be evident that the high frequencies of the signal $S_j(t)$ are each time effectively removed, which frequencies are preserved in the signals $D_j(t)$.

Figure 5:
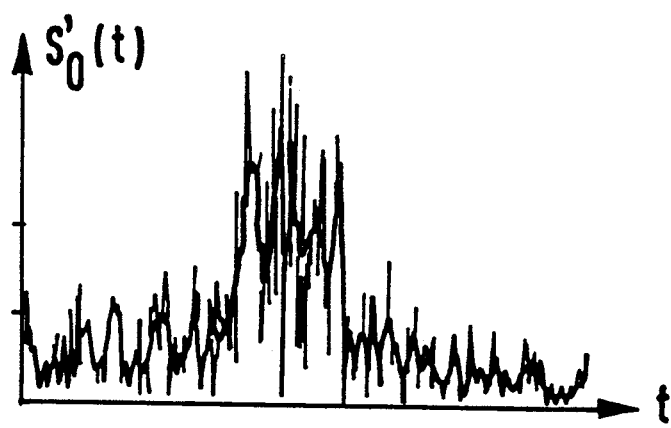
FIG. 5 shows an example of the reconstruction of the signal $S_o(t)$ of FIG. 4.

FIG. 5 shows the results $S'_o(t)$, in heavy lines, of the reconstruction on the basis of the signals $S_j(t)$ and $D_j(t)$ of FIG. 4 when the thresholds $A_1=2$, $A_2=3$, $A_3=4$ are applied. The initial signal $S_o(t)$ is denoted by a thin line. It will be evident that the signal $S'_o(t)$ does not contain speckle, but still includes high frequencies, for example upon passages through the walls.

I claim:

1. An ultrasonic echographic apparatus for processing an echographic signal $S_o(t)$, comprising:
    a sampling means for supplying N discrete values $C_{ok}$ of the echographic signal $S_o(t)$ where k is 1, 2, ... , N,
    p cascade connected decomposition means each decomposition means comprising:
    a low frequency transmission channel which successively comprises a low pass filter which realizes the correlation of the input-signal $S_{j-1}(t)$ with a scaling filter h(t), and a decimeter which retains only one out of two values with respect to k of the result of said correlation, so in total the $N/2^j$ values $C_{jk}$ for k=1, $1+2^j$, $1+2\times 2^j$, $1+3\times 2^j$, ..., representing $s_j(t)$ which is the low-frequency component of $s_o(t)$ of the order j,
    a high frequency reducing channel which successively comprises a high frequency filter which realizes the correlation of the input signal $S_{j-1}(t)$ with a wavelet filter g(t), and a decimeter which retains only one of two values with respect to k of the result of said correlation, so in total the $N/2^j$ values $W_{jk}$ for k=1, $1+2^j$, $1+2\times 2^j$, $1+3\times 2^j$..., and
    memory means for storing said values and representing $D_j(t)$ which is the high-frequency component of $S_o(t)$ of the order j, said low-frequency and high-frequency filters being quadrature mirror filters,
    p cascade connected reconstruction means, each reconstruction means comprising:
    a high frequency enhancement channel which successively comprises a means for comprising $|C'_{jk}/W_{jk}|$ with a predetermined threshold $A_j$, $C'_{jk}$ representing the values of $S'_j(t)$, which is the reconstructed signal of the order j, which comparison means outputs the $N/2j$ values of $W_{jk}$ if $|C'_{jk}/W_{jk}|<A_j$ for all k, or $N/2j$ zeros in the opposite case, a first means for doubling the sampling which inserts a zero between two consecutive values of the signal supplied by the comparison means, and a high frequency convolution means which realizes the convolution of the signal supplied by the means for doubling sampling with the wavelet filter g(t), and
    an actual reconstruction channel which successively comprises a second means for doubling the sampling which inserts a zero between two consecutive values of $C'_{jk}$, a low frequency convolution means which realizes the convolution of the signal supplied by the second means for doubling, for doubling the sampling with the scaling filter h(t), and an adder means which supplies the reconstructed signal $S'_{j-1}(t)$ of the order $j-1$ by forming the sum of the output signals of the high frequency and low frequency convolution means thereby providing enhanced processing of the echographic signal.

* * * * *